United States Patent
Ohashi et al.

(10) Patent No.: US 9,233,522 B2
(45) Date of Patent: Jan. 12, 2016

(54) POLYESTER RESIN FOR COATING METAL PLATE, RESIN-COATED METAL PLATE BEING COATED WITH THE SAME, AND METAL CAN AND LID

(75) Inventors: Kazuaki Ohashi, Yokohama (JP); Kazuhiro Sato, Yokohama (JP); Tomoko Yoshii, Yokohama (JP)

(73) Assignee: TOYO SEIKAN KAISHA, LTD., Tokyo (JP)

( * ) Notice: Subject to any disclaimer, the term of this patent is extended or adjusted under 35 U.S.C. 154(b) by 975 days.

(21) Appl. No.: 11/816,210

(22) PCT Filed: Feb. 16, 2006

(86) PCT No.: PCT/JP2006/303089
§ 371 (c)(1),
(2), (4) Date: Aug. 14, 2007

(87) PCT Pub. No.: WO2006/088212
PCT Pub. Date: Aug. 24, 2006

(65) Prior Publication Data
US 2009/0011162 A1 Jan. 8, 2009

(30) Foreign Application Priority Data
Feb. 15, 2005 (JP) ................. 2005-037289

(51) Int. Cl.
| | | |
|---|---|---|
| *B32B 15/08* | (2006.01) | |
| *B32B 1/08* | (2006.01) | |
| *C08G 63/08* | (2006.01) | |
| *B32B 27/36* | (2006.01) | |
| *C08G 63/16* | (2006.01) | |
| *C08G 63/199* | (2006.01) | |
| *C08J 5/18* | (2006.01) | |
| *C09D 167/02* | (2006.01) | |
| *B32B 15/09* | (2006.01) | |
| *B32B 15/18* | (2006.01) | |
| *B32B 15/20* | (2006.01) | |

(52) U.S. Cl.
CPC .............. *B32B 15/08* (2013.01); *B32B 15/09* (2013.01); *B32B 15/18* (2013.01); *B32B 15/20* (2013.01); *B32B 27/36* (2013.01); *C08G 63/16* (2013.01); *C08G 63/199* (2013.01); *C08J 5/18* (2013.01); *C09D 167/02* (2013.01); *B32B 2307/558* (2013.01); *B32B 2307/714* (2013.01); *B32B 2439/66* (2013.01); *B32B 2439/70* (2013.01); *C08J 2367/02* (2013.01); *Y10T 428/1352* (2015.01); *Y10T 428/31681* (2015.04)

(58) Field of Classification Search
CPC ........ B32B 15/09; B32B 15/18; B32B 15/20; B32B 2439/66; B32B 2307/558; C08G 15/12; C08G 15/16; C08G 15/18; C08G 15/199; C09G 167/02; C08J 2367/02; Y10T 428/1352; Y10T 428/31681
USPC ............ 428/35.8, 458, 35.7–35.9; 220/62.12, 220/62.22, 906; 528/271–286
See application file for complete search history.

(56) References Cited

U.S. PATENT DOCUMENTS

| | | | | |
|---|---|---|---|---|
| 3,915,913 | A * | 10/1975 | Jackson et al. ................. | 525/168 |
| 4,173,506 | A | 11/1979 | Pletcher | |
| 5,070,121 | A | 12/1991 | Hinterwaldner et al. | |
| 5,191,779 | A * | 3/1993 | Imazu et al. ...................... | 72/46 |
| 5,698,308 | A * | 12/1997 | Sumiya et al. ............. | 428/317.9 |
| 5,747,174 | A * | 5/1998 | Kimura et al. ................ | 428/480 |
| 6,071,599 | A * | 6/2000 | Kosuge et al. ................ | 428/213 |
| 6,277,455 | B1* | 8/2001 | Shimizu et al. ............. | 428/35.9 |
| 6,309,720 | B1* | 10/2001 | Shimizu et al. ............. | 428/35.9 |
| 6,319,576 | B1* | 11/2001 | Rule et al. ................... | 428/35.7 |
| 6,764,730 | B2* | 7/2004 | Sato et al. ................... | 428/35.8 |
| 7,588,816 | B2* | 9/2009 | Konrad et al. ............... | 428/141 |
| 2001/0031327 | A1* | 10/2001 | Sato et al. ................... | 428/35.8 |
| 2002/0102419 | A1 | 8/2002 | Kawahara et al. | |
| 2003/0039778 | A1* | 2/2003 | Sato et al. ................... | 428/35.7 |
| 2005/0191483 | A1* | 9/2005 | Yoshida et al. ............... | 428/332 |
| 2006/0083908 | A1* | 4/2006 | Yoshida et al. ............... | 428/216 |
| 2006/0147733 | A1* | 7/2006 | Yamanaka et al. ............ | 428/458 |
| 2006/0199023 | A1* | 9/2006 | Funagi et al. ................. | 428/458 |
| 2008/0241448 | A1* | 10/2008 | Sato et al. ................... | 428/35.8 |

FOREIGN PATENT DOCUMENTS

| | | | |
|---|---|---|---|
| EP | 0347516 A2 | 12/1989 | |
| EP | 1178091 A2 | 2/2002 | |
| EP | 1607424 A1 | 12/2005 | |
| JP | 11-106526 A | 4/1994 | |
| JP | 8-1863 A | 1/1996 | |
| JP | 2001-260295 A | 9/2001 | |
| JP | 2002-173541 A | 6/2002 | |
| WO | WO 2004083279 A1 * | 9/2004 | .......... C08G 63/183 |
| WO | 2005092963 A1 | 10/2005 | |
| WO | 2006022899 A2 | 3/2006 | |

* cited by examiner

*Primary Examiner* — Gwendolyn Blackwell
*Assistant Examiner* — Lee Sanderson
(74) *Attorney, Agent, or Firm* — Sughrue Mion, PLLC

(57) ABSTRACT

A polyester resin for metal plate coating which contains a dimer acid in an amount of 2 to 10 mol %, as a dicarboxylic acid component and has a weight average molecular weight (Mw) ranging from 70,000 to 160,000. Thus, there can be provided a polyester resin for metal plate coating that has not only excellent film forming capability and corrosion resistance but also excellent impact resistance. Further, there can be provided a resin-coated metal plate excelling in properties, such as corrosion resistance, impact resistance (dent resistance), workability and flavor, and provided, fabricated from the resin-coated metal plate, a metal can and can lid.

6 Claims, No Drawings

POLYESTER RESIN FOR COATING METAL PLATE, RESIN-COATED METAL PLATE BEING COATED WITH THE SAME, AND METAL CAN AND LID

FIELD OF THE INVENTION

The present invention relates to a polyester resin for coating metal plate. More specifically, the invention relates to a polyester resin having excellent film-forming property and shock resistance, to a resin-coated metal plate coated with the polyester resin, and to a metal can and a lid made from the resin-coated metal plate.

BACKGROUND ART

It has long been a widely accepted practice to coat the metal surfaces with a resin layer as means for imparting corrosion resistance to the metal material. As coating methods used in this technology, there have been known a method of coating the metal surfaces with a solution obtained by dispersing a thermosetting resin such as an epoxy resin or a phenol resin in a solvent, and a method of sticking a film of the type of polyester, olefin or polyamide onto the metal substrate via a primer of the type of isocyanate, epoxy or phenol. According to these methods, however, some thermosetting resins and primers that are used contain a bisphenol A which may elute out. Besides, even from the standpoint of the necessity for coating the solvent and the cost thereof, it has been desired to provide means that substitutes for the above methods.

It has been widely known to utilize the heat-melting property of the thermoplastic resin for sticking the metal substrate and the thermoplastic resin together as represented by a method of sticking a pre-formed film of a thermoplastic polyester resin or the like onto a metal plate by heat-adhesion and a method of sticking a thin molten film of a thermoplastic polyester or the like that is extruded onto the metal plate.

The latter method of sticking onto the metal plate by the extrusion lamination offers such advantages that the treatment can be conducted at very high speeds involving decreased operation for forming films and decreased cost. When a generally employed polyester is used, however, the film swings and pulsates making it difficult to form a coating layer of a uniform thickness on the metal plate maintaining stability and close adhesion.

Further, the resin-coated metal plate used for producing cans requires close adhesion of the film during the working to withstand severe working such as draw working or draw-ironing of the resin-coated metal plate and, further, requires shock resistance (dent resistance) to withstand the vendor and the like. Depending upon the content, further, there are further required corrosion resistance and shock resistance to meet the cases of when placed under high-temperature and high-humidity heated conditions such as retort sterilization and to meet the cases of when stored in a hot vendor.

As the resin-coated metal plate having such properties, JP-A-2001-328208 proposes a resin-coated metal plate of which a thermoplastic resin layer comprises a polyester containing a polyethylene terephthalate as a chief component and an ethylene type polymer, the resin layer containing a tocopherol or a derivative thereof in an amount of 0.05 to 3% by weight.

DISCLOSURE OF THE INVENTION

The above resin-coated metal plate has a good flavor-retaining property yet maintaining excellent shock resistance and close adhesion, the excellent shock resistance being imparted as a result of being blended with an ionomer resin. Upon blending the polyester resin with the ionomer resin, however, the ionomer resin coagulates to form lumps depending upon the conditions arousing a new technical problem in that the yield of the product cannot be increased.

It is, therefore, an object of the present invention to provide a polyester for coating metal plate having excellent film-forming property and corrosion resistance as well as excellent shock resistance even without being blended with the ionomer resin.

Another object of the present invention is to provide a resin-coated metal plate having excellent properties such as corrosion resistance, shock resistance (dent resistance), workability, close adhesion and flavor-retaining property, as well as a metal can and a can lid made from the resin-coated metal plate.

According to the present invention, there is provided a polyester resin for coating metal plate containing a dimeric acid, as a dicarboxylic acid component, in an amount of 2 to 10 mol %, and having a weight average molecular weight (Mw) in a range of 70,000 to 160,000.

In the polyester resin for coating metal plate of the present invention, it is desired that:
1. An isophthalic acid is contained in an amount of 1 to 15 mol % as the dicarboxylic acid; and
2. A glass transition temperature is in a range of 30 to 70° C., and a rate of crystallization at 185° C. is not higher than 0.014 $\sec^{-1}$.

According to the present invention, there is further provided a film comprising the above polyester resin.

According to the present invention, there is further provided a resin-coated metal plate coated with the above polyester resin. It is desired that the resin-coated metal plate of the present invention has a layer of the polyester resin as a lower layer and a layer of another polyester resin as an upper layer.

According to the present invention, there are further provided a metal can and a lid made from the above resin-coated metal plate.

The polyester resin for coating metal plate of the invention contains a dimeric acid, as a dicarboxylic acid component, in an amount of 2 to 10 mol %, and has a weight average molecular weight (Mw) in a range of 70,000 to 160,000, making it possible to impart excellent shock resistance even without being blended with the ionomer resin and to produce the resin-coated metal plate having good film-forming property and excellent shock resistance (dent resistance) maintaining good yields.

Besides, the resin-coated metal plate coated with the polyester resin of the present invention exhibits excellent corrosion resistance, close adhesion of the film during the working and flavor-retaining property. The metal cans and lids formed by using the above resin-coated metal plate exhibit excellent adhesion of the film during the working and corrosion resistance even when subjected to severe working and, further, do not permit shock resistance to decrease but exhibit excellent shock resistance even when subjected to the retort sterilization treatment or are stored in a hot vendor.

It is important that the polyester resin of the invention contains a dimeric acid, as a dicarboxylic acid component, in an amount of 2 to 10 mol %, and has a weight average molecular weight (Mw) in a range of 70,000 to 160,000.

The dimeric acid which is a component essential for the polyester resin of the present invention has a flexible and long alkylene chain in the molecules. By using the dimeric acid as a copolymerizable component, the polyester resin exhibits a decreased glass transition temperature and flexibility and, therefore, improved shock resistance. As a result, it is made possible to produce a film- or resin-coated metal plate maintaining good productivity without involving a problem of decreased yield caused by the coagulation of the ionomer resin inherent in the prior art.

It is further important that the polyester resin of the present invention has a weight average molecular weight (Mw) in a range of 70,000 to 160,000 and, particularly, 90,000 to 140,000 to obtain excellent film-forming property. That is, a polyester resin (polyethylene terephthalate), generally, has a low melt viscosity. When subjected to the cast-film formation or is extrusion-laminated onto a metal substrate at a high speed, therefore, the molten resin film coming out from the T-die swings at the ends in the direction of width thereof, which is a film swing phenomenon, and the molten resin film coming out from the T-die assumes irregular thickness in the lengthwise direction thereof, which is a pulsation phenomenon. On the other hand, the polyester resin of the present invention has a weight average molecular weight (Mw) in the above range, and maintains a melt viscosity of not smaller than 6,000 poises at 260° C. and a shearing rate of 243 $\sec^{-1}$ which are general conditions for melt/knead extruding a polyester resin, without arousing the above problem and maintaining excellent film-forming property.

In the polyester resin of the invention, it will become obvious from the results of Examples appearing later that the dimeric acid content and the weight average molecular weight (Mw) have critical meanings. That is, the polyester resins of the invention having the dimeric acid content and the weight average molecular weight (Mw) in the above ranges are excellent concerning all of film-forming a property, shock resistance (dent resistance), close adhesion, corrosion resistance and flavor-retaining property (Examples 1 to 6), while the polyester resins containing the dimeric acid in amounts smaller than the above range exhibit inferior shock resistance though other requirements are all satisfied (Comparative Examples 1 and 2), and the polyester resins having the dimeric acid in amounts larger than the above range develop seizure at the time of granulating the resins and are not suited for coating the metal plate. Further, even after the granulation is completed by cooling, the polyester resin exhibits poor film-forming property (Comparative Example 3). If the weight average molecular weight is smaller than 70,000, the polyester resin develops film swining, film pulsation and poor film-forming property even though other requirements may have all been satisfied (Comparative Example 4). On the other hand, if the weight average molecular weight exceeds 160,000, an extended period of time is required for the solid phase polymerization and, besides, gelling occurs during the polymerization, and the polyester resin is no longer suited for coating metal plate.

BEST MODE FOR CARRYING OUT THE INVENTION (Polyester Resin)

The polyester resin of the present invention can be prepared in the same manner as the known polyester resin except that the polyester resin of the invention contains a dimeric acid, as a dicarboxylic acid component, in an amount of 2 to 10 mol % and, particularly 3 to 7.5 mol % and has a weight average molecular weight (Mw) in a range of 70,000 to 160,000 and, particularly 90,000 to 140,000.

The dimeric acid that can be preferably used for the polyester resin is, generally, a dicarboxylic acid comprising a dimer of an unsaturated fatty acid. It is desired that the unsaturated fatty acid has not less than 10 carbon atoms and is, particularly, oleic acid, linoleic acid or linolenic acid having 18 carbon atoms. The dimeric acid is prepared by dimerizing them.

The dimeric acid may be the one obtained by dimerizing the same unsaturated fatty acid or the one obtained by dimerizing different unsaturated fatty acids, and may be, further, reduced by the hydrogenation after having been dimerized. Further, the dimeric acid may partly contain an aromatic ring or a cyclic ring.

In the present invention, it is particularly desired to use a completely hydrogenated dimeric acid from the standpoint of shock resistance. A preferred dimeric acid is available in the trade name of PRIPOL1009 (Unichema Co.).

As the dicarboxylic acid component other than the dimeric acid, there can be exemplified known dicarboxylic acids that have heretofore been used for the preparation of polyester resins, such as terephthalic acid, isophthalic acid, naphthalenedicarboxylic acid, p-β-oxyethoxybenzoic acid, biphenyl-4,4'-dicarboxylic acid, diphenoxyethane-4,4'-dicarboxylic acid, 5-sodiumsulfoisophthalic acid, hexahydroterephthalic acid, adipic acid, sebacic acid, trimellitic acid, pyromellitic acid, hemimellitic acid, 1,1,2,2-ethanetetracarboxylic acid, 1,1,2-ethanetricarboxylic acid, 1,3,5-pentanetricarboxylic acid, 1,2,3,4-cyclopentanetetracarboxylic acid and biphenyl-3,4,3',4'-tetracarboxylic acid. From the mechanical properties and thermal properties of the coated layer, however, it is desired that the terephthalic acid is contained in an amount of not less than 75% and, particularly, not less than 80% of the dicarboxylic acid component.

It is desired that the polyester resin of the present invention contains the isophthalic acid as a dicarboxylic acid component in an amount of 0.1 to 15 mol %. This renders the rate of crystallization at 185° C. to be not higher than 0.014 $\sec^{-1}$ improving the close adhesion of the resin coating to the metal plate.

The isophthalic acid can be contained in the polyester resin of the present invention together with the dimeric acid as a copolymerizable component. Or, another ethylene terephthalate type polyester resin is prepared using the isophthalic acid as a copolymerizable component, and is blended with the above dimeric acid-containing polyester resin.

As for the diol component used for the polyester resin of the present invention, it is desired that not less than 50% and, particularly, not less than 80% of the diol component is an ethylene glycol from the standpoint of mechanical properties and thermal properties of the coating. As the diol component other than the ethylene glycol, there can be exemplified 1,4-butanediol, propylene glycol, neopentyl glycol, 1,6-hexylene glycol, diethylene glycol, triethylene glycol, cyclohexane dimethanol, ethylene oxide adduct of bisphenol A, glycerol, trimethylolpropane, pentaerythritol, glycerol, trimethylolpropane, 1,2,6-hexanetriol, sorbitol and 1,1,4,4-tetrakis(hydroxymethyl)cyclohexane.

It is further desired that the polyester resin of the present invention contains a vitamin E (tocopherol) in an amount of 0.1 to 2% by weight. The vitamin E works to prevent a decrease in the molecular weight caused by various thermal hystereses in a process for forming the polyester resin.

In addition to the vitamin E, there can be blended known blending agents for resins, such as an anti-blocking agent like amorphous silica, pigment like titanium dioxide (titanium white), antioxidizing agent, stabilizer, various antistatic agents and lubricant according to the known recipe.

As described above, the polyester resin of the present invention contains the dimeric acid as the dicarboxylic acid component in an amount of 2 to 10 mol % and has the glass transition temperature (Tg) in a range of 30 to 70° C., which is lower than that of the general polyethylene terephthalate (Tg=78° C.), and exhibits particularly excellent shock resistance.

It is further desired that the polyester resin of the invention has an inherent viscosity [η] in a range of 0.8 to 1.2 as measured by a method described in Examples appearing later.
(Film)

It is desired that the polyester film of the present invention is a cast film formed by the extrusion forming such as T-die method or inflation film-forming method and is, particularly, an undrawn film formed by a cast-forming method by quickly quenching the extruded film.

The thickness of the film may vary depending upon the use but is, usually, in a range of 1 to 500 μm and, particularly, 3 to 100 μm. The coating of the resin-coated metal plate for producing cans has a thickness of desirably 3 to 40 μm and, particularly, 5 to 35 μm as will be described later.
(Resin-Coated Metal Plate)

As the metal plate used for the resin-coated metal plate of the invention, there can be used various surface-treated steel plates and a light metal plate such as of aluminum. As the surface-treated steel plate, there can be used the one obtained by annealing a cold-rolled steel plate followed by the secondary cold-rolling, and one or two or more kinds of the surface treatments such as zinc plating, tin plating, nickel plating, electrolytic chromate treatment and chromate treatment. There can be further used an aluminum-coated steel plate which is plated with aluminum or to which rolled aluminum is applied.

As the light metal plate, there can be used an aluminum alloy plate in addition to the so-called pure aluminum plate.

The initial thickness of the metal plate may differ depending upon the kind of metal, use or size of the container, but is, usually, 0.10 to 0.50 mm. Among them, the thickness is 0.10 to 0.30 mm in the case of the surface-treated steel plate and is 0.15 to 0.40 mm in the case of the light metal plate.

The resin-coated metal plate of the present invention is produced by heat-adhering the polyester film comprising the above polyester resin onto the metal plate. However, the coating of the polyester resin of the present invention can be further formed by the extrusion-coating method by extruding the above polyester resin directly onto the metal plate.

In the case of the extrusion coating method, an extruder that meets the kind of the resin layer is used, the polyester is extruded through a die and is applied in a molten state onto the metal substrate so as to be heat-adhered thereto. The polyester resin is heat-adhered onto the metal substrate by utilizing the heat capacity possessed by the molten resin composition layer and the heat capacity possessed by the metal plate. The metal plate is heated at a temperature of, usually, 90 to 290° C. and, particularly preferably, 100 to 280° C.

In the resin-coated metal plate of the present invention, the resin coating layer can be adhered onto the metal blank without providing a primer layer between the resin coating layer and the metal blank. This, however, is not to exclude the provision of the primer layer; i.e., the primer layer can be provided as desired.

It is desired that the resin-coated metal plate of the present invention has a coating layer of the polyester resin formed on the surface of the metal plate and, particularly, on the metal surface that becomes the inner surface side of the container, and that the coating layer is formed maintaining a thickness of 3 to 40 μm and, particularly, 5 to 35 μm.

In the resin-coated metal plate of the invention, the coating layer of the polyester resin of the invention may be provided as at least one layer on the inner surface side when the resin-coated metal plate is formed into a container. Desirably, however, the layer of the polyester resin of the invention is formed as the lower layer (metal plate side) and another polyester resin layer having excellent flavor-retaining property is formed as the upper layer.

It is particularly desired to form a two-layer constitution having the layer of the copolymerized polyethylene terephthalate containing isophthalic acid as a copolymerizable component as the upper layer. The content of the isophthalic acid is desirably from 1 to 10 mol %.

In forming the above two layers on the metal plate, there is no problem if separately formed cast films are used. In co-extrusion laminating, however, it is desired that the layers are co-extruded in a manner that a ratio of melt tension of the lower polyester resin layer and the upper polyester resin layer is from 1.1:1 to 5:1 from the standpoint of suppressing pulsation and extrusion performance in extrusion-laminating the layers at high speeds.

Further, by selecting the ratio of thickness of the lower layer of the polyester resin of the invention and the upper layer of another polyester resin to lie in a range of 1:15 to 15:1, it is allowed to obtain both extrusion-laminating performance at high speeds and flavor-retaining property maintaining balance.
(Can and Lid)

The can of the invention can be produced by a known forming method by using the above resin-coated metal plate in a manner that the coating layer of the polyester resin of the invention is on the inner surface side of the can. Particularly, preferably, the can of the invention is a seamless can with no seam on the side surface. Therefore, the can of the invention is produced by such means as draw working, draw/deep draw working, draw/ironing working, or draw/bend-elongation/ironing working. It is desired that the thickness of the side wall is reduced to 20 to 95% and, particularly, 30 to 85% of the initial thickness of the resin-coated metal plate due to the bend-elongation based on the draw/redraw working or due to the ironing of the resin-coated metal plate.

The lid of the invention, too, can be formed by a known method of forming lids but so forming the above resin-coated metal plate that the coating layer of the polyester resin of the invention is on the inner surface side of the lid.

The shape of the lid, too, may be like that of a known can lid, such as an easy-to-open end provided with a score for forming an opening for pouring out the content and with a tab for unsealing. Or, the resin-coated metal plate may be formed as a cap comprising a top plate portion and a skirt portion as formed by such means as draw working.

EXAMPLES

The invention will now be described by way of Examples. The resins used in Examples and Comparative Examples are shown in Table 1 together with their properties measured in (1) to (4) below. Table 2 shows properties measured in (2) to (5) below of the films prepared by using the resins of Table 1 as well as the results of evaluation of (6) to (9) below of the resin-coated metal plates.
(1) Inherent Viscosity of the Resin.

200 Milligrams of each of the resins shown in Table 1 was dissolved in a phenol/1,1,2,2-tetrachloroethane mixed solution (weight ratio, 1:1) at 110° C., and was measured for its specific viscosity at 30° C. by using the Ubbelohde's viscometer. The inherent viscosity [η] (dl/g) was found in compliance with the following-formula, $$[\eta]=[(-1+(1+4K'\eta sp)^{1/2})/2K'C]$$

K': Huggins' constant (=0.33),
C: concentration (g/100 ml)
$\eta^{sp}$: specific viscosity [=(falling time of solution−falling time of solvent)/falling time of solvent]

(2) Measurement of Molecular Weight.

The resin was dissolved in a solvent of HFIP/chloroform=3/40 (V/V) and was measured for its molecular weight by the GPC. The moving phase was chloroform, the column temperature was 40° C., and the detection was taken with UV (254 nm). Measurement was taken with the polystyrene as a reference substance to find a weight average molecular weight Mw.

(3) Melt Viscosity.

By using a capillograph manufactured by Toyo Seiki Seisakusho Co., the resin was measured for its melt viscosity at a resin temperature of 260° C. and a shearing rate of 243 $sec^{-1}$.

(4) Glass Transition Temperature.

By using a differential scanning calorimeter (DSC), the resin of an amount of 5 mg was heated from 0° C. up to 300° C. at a rate of 10° C./min. in a nitrogen atmosphere, maintained at 300° C. for one minute, quickly cooled down to 0° C., and was heated again up to 300° C. at a rate of 10° C./min. Table 1 shows the glass transition temperatures that were measured and read when the temperature was elevated in the second time.

(5) Rate of Crystallization.

10 Milligrams of the cast film was measured by using the differential scanning calorimeter (DSC). First, the temperature was elevated from room temperature up to 300° C. at a rate of 30° C./min, held at this temperature for 5 minutes, quickly cooled down to 185° C. and was held at this temperature. After the start of holding in an isothermal state, an exothermic peak due to crystallization was observed. An inverse number of the peak top time was evaluated as a rate of crystallization ($sec^{-1}$). The measurement was taken in a nitrogen atmosphere.

(6) Flat Plate Dent ERV Testing.

The resin-coated metal plate was heated-treated at 225° C. for 3 minutes and, then at 205% for 2 minutes followed by a retort treatment at 125° C. for 30 minutes. Thereafter, the resin-coated metal plate was preserved in water maintained at 37° C. for one month. The coated surface to be evaluated was brought into contact with a silicone rubber having a thickness of 3 mm and a hardness of 50° under a humid condition of a temperature of 5° C. A steel ball of a diameter of five-eighths inches was placed on the opposite side with the metal plate being interposed, and a weight of 1 kg was permitted to fall from a height of 40 mm to effect the impact protrusion working.

Thereafter, the degree of cracking of the resin coating of the impact worked portion was evaluated as a current value by applying a voltage of 6.30 V to the worked portion.

The results were evaluated to be:
○: when an average current≤0.1 mA
X: when an average current>0.1 mA (7) Can Dent Testing.

The can was filled with distilled water maintained at 95° C. The can was, then, retort-treated at 125° C. for 30 minutes and was preserved in a constant-temperature vessel maintained at 37° C. for one month. In an atmosphere of 5° C., the can was permitted to fall vertically onto a surface tilted at 15° from a height of 50 cm to give an impact to the bottom of the can. After the impact was given, distilled water was drained off and a voltage of 6.30 V was applied to the impact worked portion to evaluate the degree of cracking of the resin coating in the worked portion of the can bottom as a current value.

The results were evaluated to be:
○: when an average current≤3 mA
X: when an average current>3 mA (8) Close Adhesion after the Rolling.

By using a chromic phosphate-treated aluminum alloy plate (material 5021) having a relatively low adhesion to a film as a base member, a resin-coated metal plate was prepared with its one surface coated with a resin shown in Table 2, and was rolled by a roller such that an equivalent strain was 80%. Next, 10×10 frames were engraved in the resin-coated surface of a square of one inch. An industrial strong adhesive tape was closely adhered onto the engraved surface and was forcibly peeled off to evaluate the close adhesion as a film remaining factor (%) on the metal plate.

The results were evaluated to be:
○: when an average film remaining factor≥50%
X: when an average film remaining factor<50%

(9) Retort Corrosion Resistance.

The can was filled with distilled water maintained at 95° C. The can was, then, retort-treated at 125° C. for 30 minutes and was returned back to room temperature. Distilled water was drained off and either the inner surface of the can or the inner surface of the lid was observed to evaluate the corrosion.

The results were evaluated to be:
○: when no corrosion was quite observed.
X: when abnormal condition such as corrosion was observed.

Example 1

By using two extruders and a two-layer T-die, a resin A in Table 1 was fed as the lower layer and a resin J in Table 1 was fed as the surface layer. These resins were melt-kneaded and extruded so as to form the lower layer of 12 μm and the surface layer of 4 μm, and were cooled through a cooling roll, and were taken up as a cast film.

Next, the cast film was heat-laminated on one surface of an aluminum alloy plate (plate thickness: 0.28 mm, material A3004, surface is treated with chromate/phosphate) and a cast film of a resin K was, at the same time, heat-laminated on the other surface thereof followed, immediately, by the cooling with water to obtain a resin-coated metal plate. At this moment, the temperature of the metal plate before being laminated was set to be higher than the melting point of the polyester resin by 15° C. Further, the temperature of the laminate roll was 150° C. and the plate was passed at a speed of 40 mm/min.

Further, a wax-type lubricant was applied onto the resin-coated metal plate which was, then, punched into a disk of a diameter of 152 mm. The disk was draw-worked in a manner that the resin-coated surface having the lower layer of the resin A and the surface layer of the resin J was on the inner surface side to thereby obtain a shallow draw-formed cup. Next, the shallow draw-formed cup was subjected to the ironing work to obtain a seamless cup.

The seamless cup possessed properties as described below.
Diameter of cup: 66 mm
Height of cup: 127 mm
Thickness of the side wall to the initial plate thickness: 45%

The seamless cup was subjected to the doming according to an ordinary method, and the polyester resin was heat-treated at Tm—10° C. for 3 minutes. After left to cool, the cup was subjected to the after-treatments such as trimming the edge of the opening, printing on the curved surface, baking and drying, necking, and flanging to obtain a 350-ml seamless can.

Example 2

By using two extruders and a two-layer T-die, a resin B in Table 1 was fed as the lower layer and the resin J in Table 1 was fed as the surface layer. These resins were melt-kneaded and extruded so as to form the lower layer of 24 μm and the surface layer of 4 μm, and were cooled through a cooling roll, and were taken up as a cast film.

Next, the cast film was heat-laminated on one surface of a TFS steel plate (plate thickness: 0.18 mm, amount of metal chromium: 120 mg/m$^2$, amount of chromium oxide hydrate: 15 mg/m$^2$) and a cast film of a polyester resin blended with titanium dioxide as a pigment in an amount of 20% by weight was, at the same time, heat-laminated on the other surface thereof followed, immediately, by the cooling with water to obtain a resin-coated metal plate. At this moment, the temperature of the metal plate before being laminated was set to be higher than the melting point of the polyester resin by 15° C. Further, the temperature of the laminate roll was 150° C. and the plate was passed at a speed of 40 mm/min.

Further, a wax-type lubricant was applied onto the resin-coated metal plate which was, then, punched into a disk of a diameter of 166 mm. The disk was draw-worked in a manner that the resin-coated surface having the lower layer of the resin B and the surface layer of the resin J was on the inner surface side to thereby obtain a shallow draw-formed cup. Next, the shallow draw-formed cup was subjected to the redraw/ironing work to obtain a seamless cup.

The seamless cup possessed properties as described below.
Diameter of cup: 66 mm
Height of cup: 128 mm
Thickness of the side wall to the initial plate thickness: 50%

The bottom of the seamless cup was formed according to an ordinary method, and the polyester resin was heat-treated at Tm −10° C. for 3 minutes. After left to cool, the cup was subjected to the trimming of edge of the opening, printing on the outer surface, baking and drying and necking to obtain a 350-ml seamless can.

Example 3

A resin C in Table 1 was fed to an extruder equipped with an extrusion-coating facility and was laminated onto one surface of an aluminum alloy plate (material A5182) of a thickness of 0.235 mm to obtain a resin-coated metal plate having a resin thickness of 20 μm.

At this moment, the temperature of the aluminum alloy plate before being laminated was set to be lower than the melting point of the resin by 30° C. Further, the temperature of the laminate roll was 90° C. and the plate was passed at a speed of 40 mm/min.

Next, from the resin-coated metal plate, a lid of a diameter of 68.7 mm was punched in a manner that the resin-coated surface was the inner surface side of the lid. Next, the outer surface side of the lid was subjected to the scoring (width: 22 mm, remaining thickness of score: 110 μm, score width: 20 μm) of a partly opening type and to the riveting. Further, a tub for unsealing was attached thereto to thereby produce an SOT lid (stay-on-tub lid).

Example 4

By using two extruders and a two-layer T-die, a resin D in Table 1 was fed as the lower layer and the resin J in Table 1 was fed as the surface layer. These resins were melt-kneaded and extruded so as to form the lower layer of 16 μm and the surface layer of 4 μm, and were cooled through a cooling roll, and were taken up as a cast film.

Next, the cast film was heat-laminated on one surface of a TFS steel plate (plate thickness: 0.24 mm, amount of metal chromium: 120 mg/m$^2$, amount of chromium oxide hydrate: 15 mg/m$^2$) and a cast film of a polyester resin blended with titanium dioxide as a pigment in an amount of 20% by weight was, at the same time, heat-laminated on the other surface thereof followed, immediately, by the cooling with water to obtain a resin-coated metal plate. At this moment, the temperature of the metal plate before being laminated was set to be higher than the melting point of the polyester resin by 15° C. Further, the temperature of the laminate roll was 150° C. and the plate was passed at a speed of 40 mm/min.

Further, a wax-type lubricant was applied onto the resin-coated metal plate which was, then, punched into a disk of a diameter of 158 mm. The disk was draw-worked in a manner that the resin-coated surface having the lower layer of the resin D and the surface layer of the resin J was on the inner surface side to thereby obtain a shallow draw-formed cup. Next, the shallow draw-formed cup was subjected to the redraw/ironing work, and its bottom was formed by an ordinary method to thereby obtain a deep drawn/ironed cup.

The deep drawn/ironed cup possessed properties as described below.
Diameter of cup: 52 mm
Height of cup: 141.5 mm
Thickness of the side wall to the initial plate thickness: 37%
Thickness of the flange portion to the initial plate thickness: 69%

The bottom of the deep drawn/ironed cup was formed according to an ordinary method, and the polyester resin was heat-treated at Tm −10° C. for 3 minutes. After left to cool, the cup was subjected to the trimming of the edge of the opening, printing on the outer surface, firing and drying. The cup was further subjected to the necking, beading, threading and curling to obtain a resealed can having a mouth diameter of 30 mm.

Example 5

A resin-coated metal plate and a seamless can were obtained in the same manner as in Example 1 but using, as a cast film, a blend of a resin E and a resin K in Table 1 as the lower layer on the inner surface side.

Example 6

A resin-coated metal plate and a seamless can were obtained in the same manner as in Example 1 but using, as a cast film, a resin F in Table 1 and vitamin E as the lower layer on the inner surface side.

Comparative Example 1

A resin-coated metal plate and a seamless can were obtained in the same manner as in Example 1 but using, as a cast film, the resin J in Table 1 as the lower layer on the inner surface side.

Comparative Example 2

A resin-coated metal plate and a seamless can were obtained in the same manner as in Example 1 but using, as a cast film, a resin G in Table 1 as the lower layer on the inner surface side.

Comparative Example 3

A cast film was obtained in the same manner as in Example 1 but using a resin H in Table 1 as the lower layer.

Comparative Example 4

A cast film was obtained in the same manner as in Example 1 but using a resin I in Table 1 as the lower layer.

As shown in Table 2, film-forming properties were favorable in Examples 1 to 6, and the resin-coated metal plates exhibited excellent dent resistance in the flat plate dent ERV testing and excellent resin adhesion after the rolling. Besides, the seamless cans and lids obtained by forming these resin-coated metal plates exhibited excellent dent resistance and corrosion resistance. Moreover, the cans and lids made from the resin-coated metal plates of Examples 1 to 6 exhibited favorable flavor-retaining property.

On the other hand, Comparative Examples 1 and 2 exhibited good film-forming properties, but the resin-coated metal plates and cans exhibited poor dent resistance and corrosion resistance. Comparative Examples 3 and 4 exhibited very poor film-forming properties and the results obtained thereafter could not be evaluated.

TABLE 1

|  | Dimeric acid mol % | Isophthalic acid mol % | Inherent viscosity cc/g | Molecular weight Mw | Melt viscosity poise | Glass transition temp. ° C. |
|---|---|---|---|---|---|---|
| Resin A | 2.0 | 10.0 | 0.93 | 90,000 | 8,500 | 64 |
| Resin B | 4.0 | 5.0 | 1.06 | 98,000 | 10,750 | 54 |
| Resin C | 4.0 | 15.0 | 1.18 | 141,000 | 12,400 | 53 |
| Resin D | 5.0 | 10.0 | 1.12 | 131,000 | 10,280 | 50 |
| Resin E | 7.5 | 0.0 | 1.17 | 123,000 | 10,790 | 41 |
| Resin F | 7.5 | 10.0 | 1.18 | 138,000 | 11,180 | 40 |
| Resin G | 1.0 | 5.0 | 1.09 | 117,000 | 11,080 | 68 |
| Resin H | 12.0 | 5.0 | 0.77 | 87,000 | 1,280 | 24 |
| Resin I | 5.0 | 5.0 | 0.83 | 68,000 | 4,710 | 49 |
| Resin J | 0.0 | 5.0 | 0.90 | 79,000 | 10,090 | 77 |
| Resin K | 0.0 | 15.0 | 0.90 | 82,000 | 2,000 | 74 |

TABLE 2

|  | Lower layer compound | Dimeric acid (mol %) | Isophthalic acid (mol %) | Film-forming property | Molecular weight Mw | Glass transition temp. (° C.) | Rate of crystallization (sec$^{-1}$) |
|---|---|---|---|---|---|---|---|
| Ex. 1 | resin A: 100% | 2.0 | 10.0 | good | 71,000 | 64 | 0.001 or less |
| Ex. 2 | resin B: 100% | 4.0 | 5.0 | good | 77,000 | 54 | 0.001 |
| Ex. 3 | resin C: 100% | 4.0 | 15.0 | good | 78,000 | 54 | 0.001 or less |
| Ex. 4 | resin D: 100% | 5.0 | 10.0 | good | 76,000 | 50 | 0.001 or less |
| Ex. 5 | resin E: 80% resin K: 20% | 6.0 | 2.9 | good | 72,000 | 46 | 0.005 |
| Ex. 6 | resin F: 99.5% vitamin E: 0.5% | 7.5 | 10.0 | good | 84,000 | 39 | 0.001 or less |
| Comp. Ex. 1 | resin J: 100% | 0.0 | 5.0 | good | 67,000 | 73 | 0.001 |
| Comp. Ex. 2 | resin G: 100% | 1.0 | 5.0 | good | 78,000 | 68 | 0.001 |
| Comp. Ex. 3 | resin H: 100% | 12.0 | 5.0 | film swings, pulsates | — | — | — |
| Comp. Ex. 4 | resin I: 100% | 5.0 | 5.0 | film swings, pulsates | — | — | — |

|  | Base member | Forming | Dent resistance (flat plate) | Dent resistance (can) | Close adhesion | Corrosion resistance |
|---|---|---|---|---|---|---|
| Ex. 1 | Al | 350-ml can | ◯ | ◯ | ◯ | ◯ |
| Ex. 2 | TFS | 350-ml can | ◯ | ◯ | ◯ | ◯ |
| Ex. 3 | Al | SOT lid | ◯ | — | ◯ | ◯ |
| Ex. 4 | TFS | resealed can | ◯ | ◯ | ◯ | ◯ |
| Ex. 5 | TFS | 350-ml can | ◯ | ◯ | ◯ | ◯ |
| Ex. 6 | TFS | 350-ml can | ◯ | ◯ | ◯ | ◯ |
| Comp. Ex. 1 | TFS | 350-ml can | X | X | ◯ | X |

TABLE 2-continued

| | | | | | | |
|---|---|---|---|---|---|---|
| Comp. Ex. 2 | TFS | 350-ml can | X | X | ○ | X |
| Comp. Ex. 3 | TFS | — | — | — | — | — |
| Comp. Ex. 4 | TFS | — | — | — | — | — |

The invention claimed is:

1. A polyester resin for coating metal plate containing a fully-hydrogenated dimeric acid in an amount of 2 mol % to 4 mol % and an isophthalic acid in an amount of 1 to 15 mol % of the entire dicarboxylic acid component constituting the polyester resin, said polyester resin having a weight average molecular weight (Mw) in a range of 70,000 to 160,000 and a glass transition temperature in a range of 53 to 64° C., and a rate of crystallization at 185° C. of not higher than 0.014 sec$^{-1}$, and said hydrogenated dimeric acid comprising 23 mol % of aliphatic dimeric acid, 64 mol % of alicyclic dimeric acid and 13 mol % of aromatic dimeric acid.

2. A film comprising the resin of claim 1.

3. A resin-coated metal plate coated with the resin of claim 1.

4. The resin-coated metal plate according to claim 3, comprising a layer of the polyester resin as a lower layer and further comprising an upper layer of a polyethylene terephthalate disposed on said lower layer having a composition different from that of the lower layer and including the isophthalic acid of the lower layer as a copolymerizable component.

5. A metal can made from the resin-coated metal plate of claim 3.

6. A lid made from the resin-coated metal plate of claim 3.

* * * * *